(12) United States Patent
Tsukahara (10) Patent No.: US 10,924,038 B2
(45) Date of Patent: Feb. 16, 2021

(54) CAPACITIVE ACTUATOR MOTOR, CAPACITIVE ACTUATOR, AND CAPACITIVE ACTUATOR UNIT

(71) Applicant: SUMITOMO HEAVY INDUSTRIES, LTD., Tokyo (JP)

(72) Inventor: Shinichiro Tsukahara, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 761 days.

(21) Appl. No.: 15/702,357

(22) Filed: Sep. 12, 2017

(65) Prior Publication Data

US 2018/0006585 A1    Jan. 4, 2018

Related U.S. Application Data

(63) Continuation of application No. PCT/JP2015/085111, filed on Dec. 15, 2015.

(30) Foreign Application Priority Data

Mar. 19, 2015   (JP) .............................. JP2015-056868

(51) Int. Cl.
   *H02N 2/04*   (2006.01)
   *H02N 1/00*   (2006.01)
   *H02N 2/02*   (2006.01)

(52) U.S. Cl.
   CPC ............... *H02N 2/043* (2013.01); *H02N 1/00* (2013.01); *H02N 1/006* (2013.01); *H02N 2/02* (2013.01)

(58) Field of Classification Search
   CPC .......... H02N 2/043; H02N 1/00; H02N 1/006; H02N 2/02
   See application file for complete search history.

(56) References Cited

U.S. PATENT DOCUMENTS 8,593,035 B2    11/2013  Asada et al.
2010/0308689 A1*  12/2010  Rahman .................. E21B 23/00
                                                    310/328

(Continued)

FOREIGN PATENT DOCUMENTS

JP    2012-121130 A    6/2012
JP    2013-511254 A    3/2013

(Continued)

OTHER PUBLICATIONS

International Search report issued in Application No. PCT/JP2015/085111, dated Mar. 8, 2016.

*Primary Examiner* — Bryan P Gordon
(74) *Attorney, Agent, or Firm* — Michael Best & Friedrich LLP (57) ABSTRACT

A capacitive actuator motor according to an embodiment of the present invention includes a capacitive actuator having six actuator units and a motor output cam having a periodic shape portion. Each of the six actuator units includes a buckling displacement expansion mechanism configured to convert an output of a piezoelectric element and urge an output joint in a predetermined output direction and a preload adjustment spring configured to urge an output joint with a certain characteristic in a direction in which the periodic shape portion and the output joint come into contact with each other.

10 Claims, 9 Drawing Sheets

(56) References Cited

U.S. PATENT DOCUMENTS

| | | | |
|---|---|---|---|
| 2010/0320870 A1* | 12/2010 | Rahman | H02N 2/043 310/328 |
| 2011/0109198 A1* | 5/2011 | Asada | H02N 2/02 310/328 |
| 2012/0229000 A1 | 9/2012 | Asada et al. | |
| 2016/0336878 A1* | 11/2016 | Torres | H02N 2/043 |

FOREIGN PATENT DOCUMENTS

| | | |
|---|---|---|
| JP | 2014-082930 A | 5/2014 |
| JP | 2014-204666 A | 10/2014 |

\* cited by examiner

CAPACITIVE ACTUATOR MOTOR, CAPACITIVE ACTUATOR, AND CAPACITIVE ACTUATOR UNIT

RELATED APPLICATIONS

Priority is claimed to Japanese Patent Application No. 2015-056868, filed Mar. 19, 2015, and International Patent Application No. PCT/JP2015/085111, the entire content of each of which is incorporated herein by reference.

BACKGROUND

Technical Field

Certain embodiment of the present invention relates to a capacitive actuator motor, a capacitive actuator, and a capacitive actuator unit.

Description of Related Art

In the related art, a multi-pair buckling actuator which moves on an entirely linear rail including an upper surface having a periodic wave-shaped contour in a side view is known (for example, refer to PTL 1).

The multi-pair buckling actuator includes a buckling mechanism which is a displacement expansion mechanism which expands extensions of a pair of piezoelectric elements disposed so as to face each other in a straight line in an output direction perpendicular to the extension direction and outputs the extension as displacement of an output portion. In addition, the buckling mechanism generates a thrust by pressing the output portion displaced in an output direction to a rail.

SUMMARY

According to an embodiment of the present invention, there is provided a capacitive actuator motor, including: a capacitive actuator including a plurality of actuator units; and a motor output cam including a periodic shape portion, in which each of the plurality of actuator units includes a displacement expansion mechanism configured to convert an output of an expandable element having capacitive properties and urge an output transmission portion in a predetermined output direction and an urger configured to urge the output transmission portion with a certain characteristic in a direction in which the periodic shape portion and output transmission portion come into contact with each other.

DETAILED DESCRIPTION

However, the multi-pair buckling actuator of the related art, the thrust can be generated only in a case where the above-described multi-pair buckling actuator presses the output portion of the buckling mechanism to the rail. Accordingly, the thrust cannot be generated in a case where the output portion is away from the rail. Therefore, it is not possible to sufficiently use energy which can be output by the piezoelectric element.

In view of the above, it is desirable to provide a capacitive actuator motor capable of more effectively using energy which can be output by an expandable element having capacitive properties.

Figure 1A:
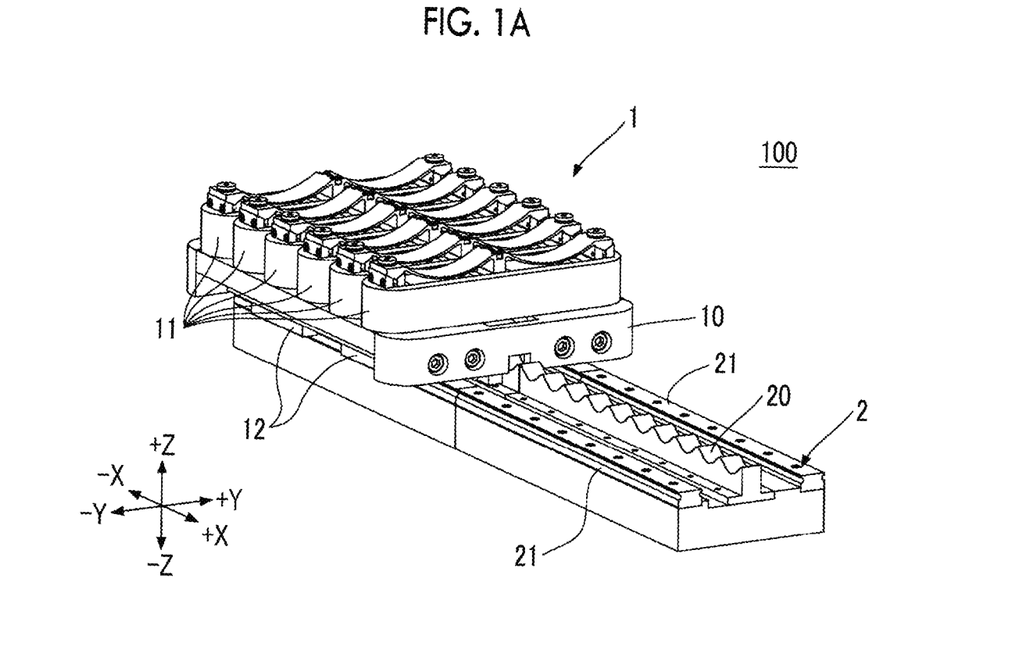
FIG. 1A is a perspective view showing a configuration example of a capacitive actuator motor according to an embodiment of the present invention.
Figure 1B:
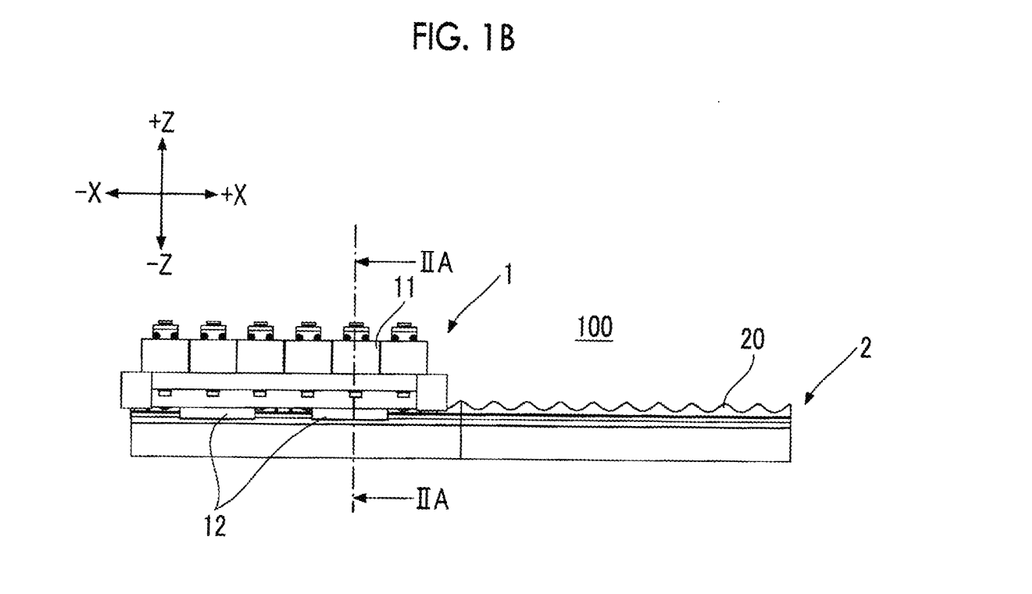
FIG. 1B is a side view of the capacitive actuator motor.
Figure 1C:
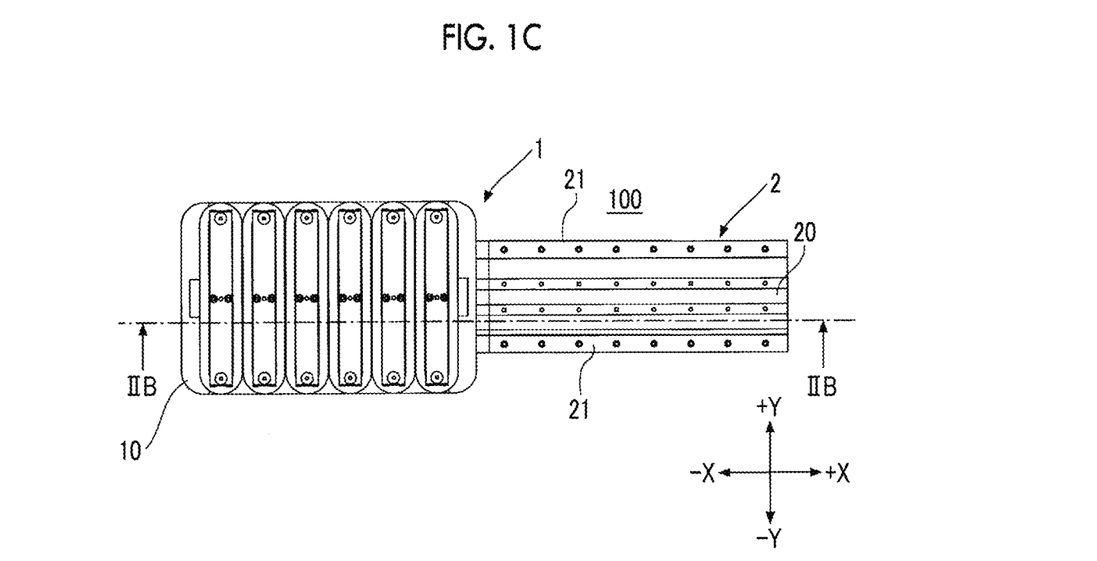
FIG. 1C is a top view of the capacitive actuator motor.
Figure 2A:
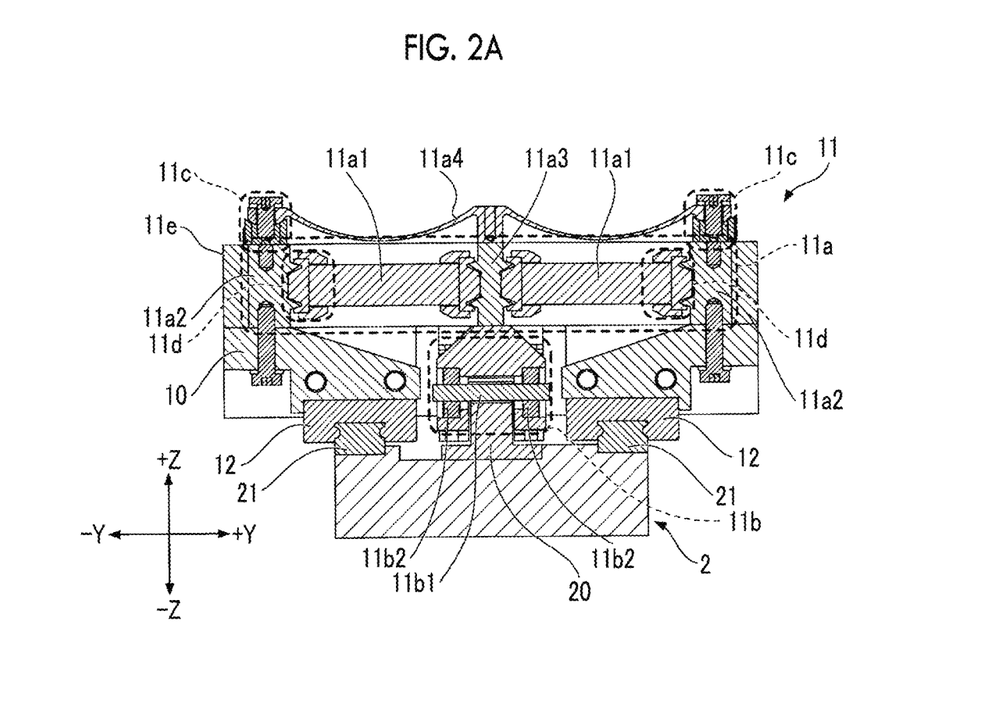
FIG. 2A is a sectional view showing a configuration example of a main portion of the capacitive actuator motor.
Figure 2B:
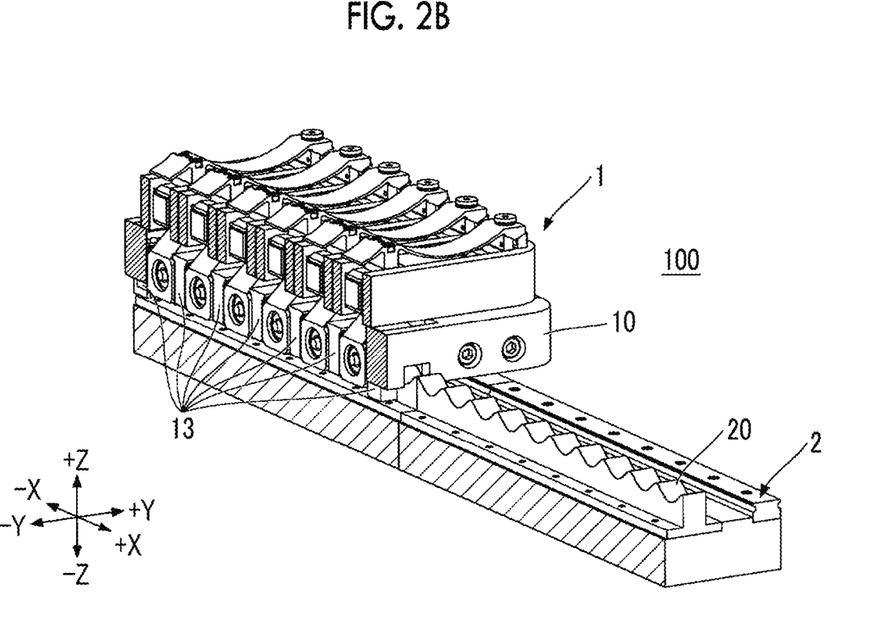
FIG. 2B is a sectional perspective view showing the configuration example of the main portion of the capacitive actuator motor.

Hereinafter, a preferred embodiment of the present invention will be described with reference to the drawings. FIGS. 1A to 1C are views showing a configuration example of a capacitive actuator motor 100 according to an embodiment of the present invention. Specifically, FIG. 1A is a perspective view of the capacitive actuator motor 100, FIG. 1B is a side view of the capacitive actuator motor 100, and FIG. 1C is a top view of the capacitive actuator motor 100. In addition, FIGS. 2A and 2B are views showing a configuration example of a main portion of the capacitive actuator motor 100 in FIGS. 1A to 1C. Specifically, FIG. 2A is a view of when a cross section shown by a one-dot chain line of FIG. 1B is viewed in a IIA direction, and FIG. 2B is a view of when a cross section shown by a one-dot chain line of FIG. 1C is viewed in a IIB direction.

The capacitive actuator motor 100 mainly includes a capacitive actuator 1 and a motor output cam 2.

The capacitive actuator 1 is an actuator which generates a drive force using an expandable element having capacitive properties, and mainly includes a motor frame 10, actuator units 11, motor guides 12, and expansion output linear guides 13. In the present invention, the expandable element having capacitive properties is a piezoelectric element. However, the expandable element may be a hydraulic cylinder, a pneumatic cylinder, or the like.

The motor frame 10 is a functional element which bundles each of the plurality of actuator units 11. In the present embodiment, the motor frame 10 is a frame-shaped member in a top view and each of six actuator units 11 is fixed to the inner portion of the frame.

Each of the actuator units 11 is a drive unit which configures the capacitive actuator 1. In the present embodiment, the actuator unit 11 mainly includes a buckling displacement expansion mechanism 11a, an output joint 11b, spring preload adjustment mechanisms 11c, piezo preload adjustment mechanisms 11d, and an outer shell 11e.

The buckling displacement expansion mechanism 11a is a mechanism which expands displacement of the expandable element using a buckling phenomenon. In the present embodiment, the buckling displacement expansion mechanism 11a mainly includes a pair of piezoelectric elements 11a1, a pair of fixation portions 11a2, an output portion 11a3, and a preload adjustment spring 11a4.

Figure 3A:
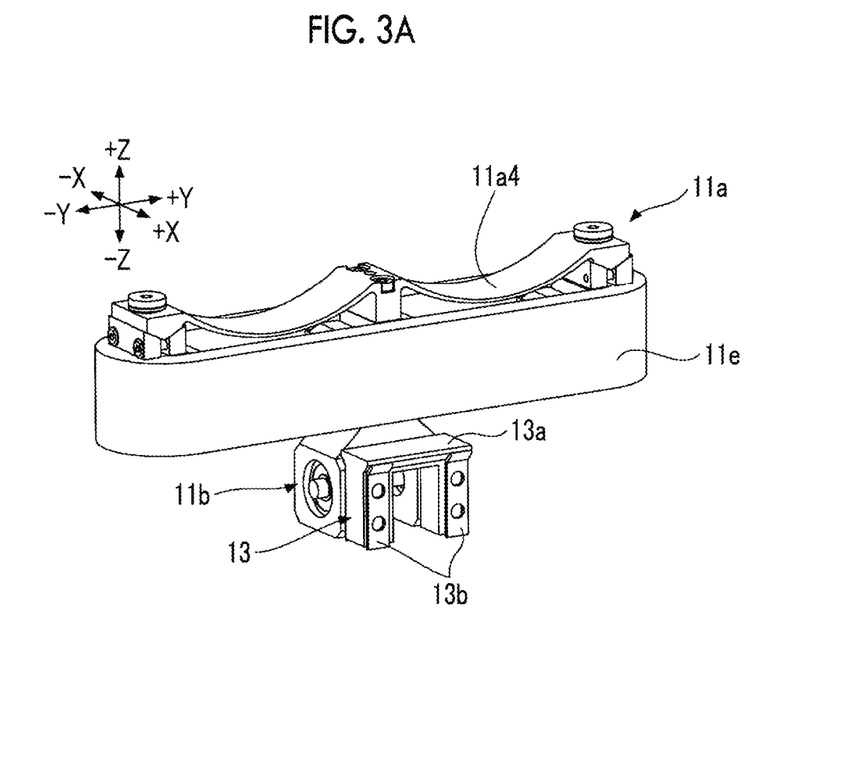
FIG. 3A is a perspective view of an actuator unit.
Figure 3B:
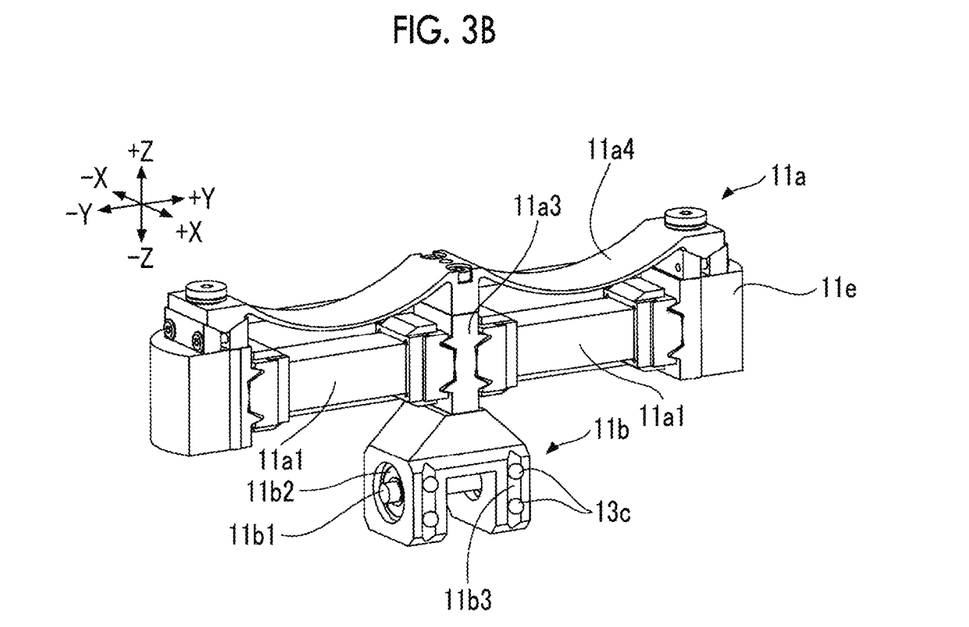
FIG. 3B is a perspective view of the actuator unit in a state where a portion of an outer shell is cut out.
Figure 3C:
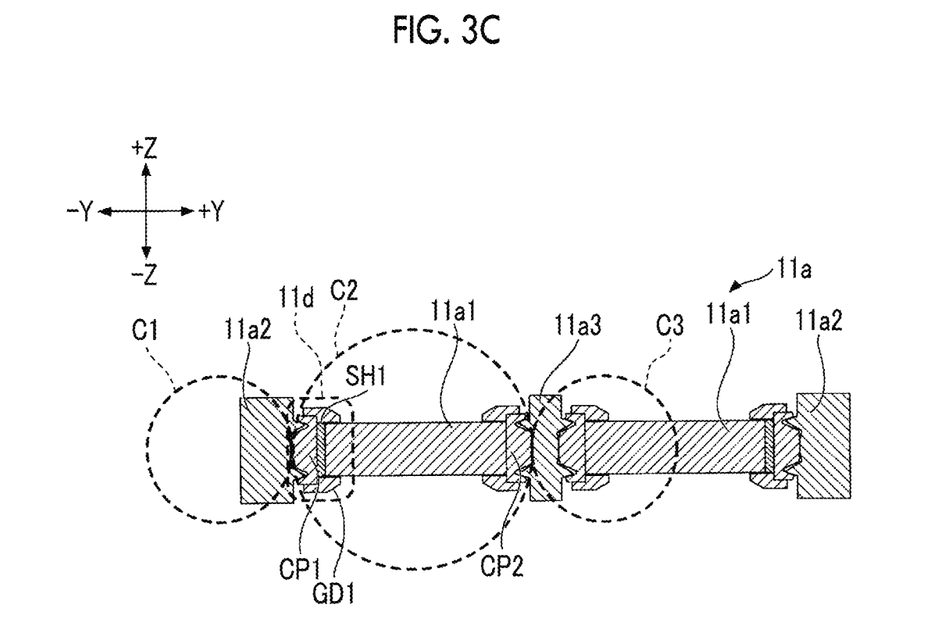
FIG. 3C is a sectional view of the actuator unit.

Here, the actuator unit 11 will be described in detail with reference to FIGS. 3A to 3C. In addition, FIG. 3A is a perspective view of the actuator unit 11 and FIG. 3B is a perspective view of the actuator unit 11 in a state where a portion of the outer shell 11e is cutout. Moreover, FIG. 3C is a sectional view showing the pair of piezoelectric elements 11a1, the pair of fixation portions 11a2, and the output portion 11a3.

One end of each of the pair of piezoelectric elements 11a1 is connected to the fixation portion 11a2 via a rolling joint and the other end thereof is connected to the output portion 11a3 via a rolling joint. In the present embodiment, the piezoelectric element 11a1 is configured of laminated ceramics. As shown in FIG. 3C, the rolling joint means a connection via a rolling contact between an end spherical surface of a cap CP1 positioned on the left end of the left piezoelectric element 11a1 and an end spherical surface of the left fixation portion 11a2 and a connection via a rolling contact between an end spherical surface of a cap CP2 positioned on the right end of the left piezoelectric element 11a1 and the left end spherical surface of the output portion 11a3. Moreover, a circle C1 in FIG. 3C indicates a circle including a contour of the end spherical surface of the left fixation portion 11a2, a circle C2 indicates a circle including contours of the end spherical surfaces of the caps CP1 and CP2, and a circle C3 indicates a contour of the left end spherical surface of the output portion 11a3. In addition, the right piezoelectric element 1a1 is also similar.

In a case where a voltage is applied to each of the pair of piezoelectric elements 11a1, the piezoelectric element 11a1 extends in a longitudinal direction (Y axis direction) to generate a buckling phenomenon and displaces the output portion 11a3 in a direction (Z axis direction) orthogonal to the longitudinal direction by displacement which is larger than the displacement of the extension. In this way, the buckling displacement expansion mechanism 11a converts an output of each of the pair of piezoelectric elements 11a1, and urges and displaces the output portion 11a3 in a predetermined output direction. In addition, hereinafter, the displacement of the output portion 11a3 is referred to as an "expansion output".

Each of the pair of fixation portions 11a2 is a member which is fixed to the motor frame 10. In the present embodiment, as shown in FIG. 2A, the fixation portions 11a2 are fastened and fixed to the motor frame 10.

The output portion 11a3 is a function element which transmits the output of the buckling displacement expansion mechanism 11a to the outside. In the present embodiment, in the output portion 11a3, the end portion on the +Z side is connected to the preload adjustment spring 11a4 and the end portion on the −Z side is connected to the output joint 11b.

The preload adjustment spring 11a4 is an example of urging means which urges the output portion 11a3 of the buckling displacement expansion mechanism 11a with a certain characteristic. In the present embodiment, the preload adjustment spring 11a4 urges the output portion 11a3 in a direction in which the motor output cam 2 and the output joint 11b come into contact with each other and adjusts a displacement-thrust characteristic which is a relationship between the expansion output of the output portion 11a3 and a thrust caused by the expansion output. Specifically, the preload adjustment spring 11a4 is configured of a plate spring including a pair of curved portions which is curved to bulge in the −Z direction, a center portion of the preload adjustment spring 11a4 is fixed to the output portion 11a3, and both end portions thereof are connected to the pair of fixation portions 11a2 via the spring preload adjustment mechanism 11c. The preload adjustment spring 11a4 generates a force in the Z axis direction which offsets the thrust caused by the expansion output of the output portion 11a3. Hereinafter, the force generated by the preload adjustment spring 11a4 is referred to as an "offset force".

The output joint 11b is an example of an output transmission portion which transmits the output of the buckling displacement expansion mechanism 11a to the motor output cam 2. In the present embodiment, the output joint 11b mainly includes a follower roller 11b1 and roller bearings 11b2, presses the follower roller 11b1 to a periodic shape portion 20 of the motor output cam 2, and thus, transmits the expansion output of the output portion 11a3 to the motor output cam 2. In addition, the follower roller 11b1 is a member which comes into roll-contact with the periodic shape portion 20 of the motor output cam 2. Moreover, each of the roller bearings 11b2 is a member which rotatably supports the follower roller 11b1 around a rotation axis extending in the Y axis direction.

The spring preload adjustment mechanism 11c is a mechanism which adjusts an offset force by the preload adjustment spring 11a4. In the present embodiment, the spring preload adjustment mechanism 11c is configured of a wedge block. A user adjusts the positions of both end portions of the preload adjustment spring 11a4 in the Z axis direction, and thus, can adjust an offset force which is the force by which the center portion of the preload adjustment spring 11a4 presses the output portion 11a3 in the −Z direction.

The piezo preload adjustment mechanism 11d is a mechanism which performs application and adjustment of a preload with respect to four rolling joints in the buckling displacement expansion mechanism 11a. In the present embodiment, as shown in FIG. 3C, the piezo preload adjustment mechanism 11d includes the cap CP1, a guide GD1, and a shim SH1.

The cap CP1 is a member which is attached to the left end of the left piezoelectric element 11a1 in order to configure the rolling joint between the left piezoelectric element 11a1 and the left fixation portion 11a2.

The guide GD1 is a member which guides the cap CP1 to be detachably attached to the left end of the left piezoelectric element 11a1, and is fixed to the cap CP1. The cap CP1 and the shim SH1 are configured so as to transmit the thrust generated by the piezoelectric element 11a1 with high efficiency. Accordingly, preferably, the cap CP1 and the shim SH1 are formed of a material having high elasticity and strength such as a steel material or ceramics. The guide GD1 is configured so as to secure alignment of the caps CP1 and CP2 and the piezoelectric element 11a1 and protect an outer surface of the piezoelectric element 11a1. Therefore, preferably, the guide GD1 is formed of a material having lower elasticity than that of the piezoelectric element 11a1 or has a structure of low elasticity. Moreover, the cap CP1 and the guide GD1 may be integrally formed.

The shim SH1 is a member which can be disposed between the cap CP1 and the left end of the left piezoelectric element 11a1 in the guide GD1 and is used to adjust a gap between the cap CP1 and the left end of the left piezoelectric element 11a1. The preloads with respect to the four rolling joints increase as the width of the shim SH1 in the Y axis direction increases.

Moreover, the piezo preload adjustment mechanism 11*d* may be disposed not only on the left end of the left piezoelectric element 11*a*1 but also on the right end of the left piezoelectric element 11*a*1. The right piezoelectric element 11*a*1 is also similar.

The outer shell 11*e* is a functional element which fixes the distance between the pair of fixation portions 11*a*2. In the present embodiment, the outer shell 11*e* is a member which is formed to enclose the pair of piezoelectric elements 11*a*1, the pair of fixation portions 11*a*2, and the output portion 11*a*3, and prevents the distance between the pair of fixation portions 11*a*2 from increasing in a case where a buckling phenomenon is generated by the buckling displacement expansion mechanism 11*a*.

The motor guide 12 is a member which guides a linear motion of the capacitive actuator 1 along the motor output cam 2. In the present embodiment, the motor guide 12 is fixed to the motor frame 10 and engages with a motor guide rail 21 formed in the motor output cam 2.

The expansion output linear guide 13 (refer to FIG. 2B) is a functional element which guides the direction of the expansion output of the output portion 11*a*3 of the buckling displacement expansion mechanism 11*a*. In the present embodiment, the expansion output linear guide 13 includes five guides which are disposed between six actuator units 11 and two guides which are disposed between two actuator units 11 of both ends and the motor frames 10. In addition, the expansion output linear guide 13 guides the linear motion of the output portion 11*a*3 in the Z axis direction such that the expansion output of the output portion 11*a*3 becomes the maximum.

Specifically, as shown in FIGS. 3A and 3B, the expansion output linear guide 13 is not fixed to any member and is held in a state where the expansion output linear guide 13 is interposed between two output joints 11*b* or between the output joint 11*b* and the motor frame 10. In addition, the expansion output linear guide 13 includes a guide block 13*a*, ball retainers 13*b*, and guide balls 13*c*. Each of the guide balls 13*c* is held to be interposed between a ball receiving hole formed in the ball retainer 13*b* attached to the guide block 13*a* and a groove 11*b*3 which is formed on the surface of the output joint 11*b* and is slidable along the groove 11*b*3. According to this configuration, the expansion output linear guide 13 can guide the linear motion of the output joint 11*b* in the Z axis direction.

The motor output cam 2 is a functional element which integrates the expansion outputs of the plurality of actuator units 11 in the capacitive actuator 1 into one continuous motor output and mainly includes the periodic shape portion 20 and the motor guide rails 21.

The periodic shape portion 20 is a functional element which comes into contact with the follower roller 11*b*1 configuring the output joint 11*b* of the actuator unit 11. In the present embodiment, as shown in FIG. 1B, the periodic shape portion 20 is a member which includes an upper surface having a periodic wave-shaped contour in a side view. Specifically, the periodic shape portion 20 is configured such that a locus drawn by the rotation center of the follower roller 11*b*1 when the capacitive actuator 1 linearly moves along the motor output cam 2 is a sinusoid in a side view. That is, the periodic shape portion 20 has a shape including a sinusoidal component.

Each of the motor guide rails 21 is a functional element which guides the movement of the capacitive actuator 1 along the motor output cam 2. In the present embodiment, the motor guide rail 21 is configured to engage with the motor guide 12 of the capacitive actuator 1. Moreover, the motor guide 12 is operated to be guided by the motor guide rail 21.

Figure 4:
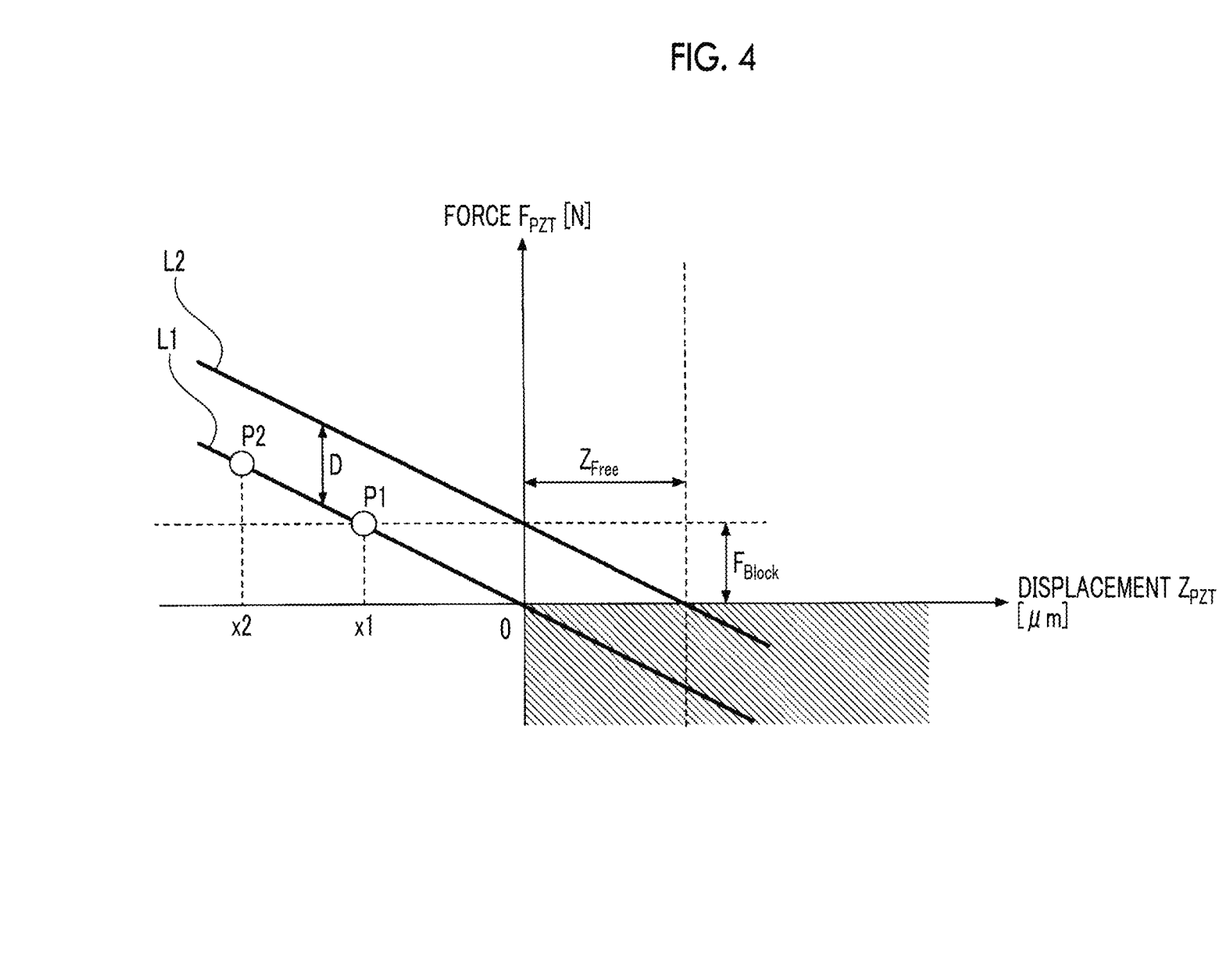
FIG. 4 is a view showing a relationship between displacement of a piezoelectric element and a thrust.

Next, output characteristics of the piezoelectric element 11*a* 1 will be described with reference to FIG. 4. FIG. 4 is a view showing a relationship between a displacement $Z_{PZT}$ of the piezoelectric element 11*a* 1 and a thrust $F_{PZT}$. In addition, a line L1 indicates the relationship of when a voltage is not applied, and a line L2 indicates the relationship of when a voltage is applied. Moreover, a difference D between the line L1 and the line L2 in a vertical axis direction indicates an electric thrust generated inside the piezoelectric element 11*a* 1 dependent on the applied voltage. Moreover, the thrust generated by the piezoelectric element 11*a*1 includes the electric thrust and a mechanical thrust which is generated inside the piezoelectric element 11*a*1 dependent on a deformation amount of the piezoelectric element 11*a*1. In addition, a blocking force $F_{Block}$ indicates an external force required to set the extension of the piezoelectric element 11*a*1 to which the voltage is applied to zero. Moreover, a no-load displacement $Z_{Free}$ indicates displacement when a voltage is applied to the piezoelectric element 11*a*1 in a no-load state. In addition, a point P1 corresponds to a state where the piezoelectric element 11*a*1 to which a voltage is not applied is compressed by x1 [µm] and a preload having the same magnitude as that of the blocking force $F_{Block}$ is added. Moreover, a point P2 corresponds to a state where the piezoelectric element 11*a*1 to which a voltage is not applied is compressed by x2 [µm] and a preload which is larger than the blocking force $F_{Block}$ is added. Moreover, a hatched region in FIG. 4 indicates an unusable region. The lamination ceramic type piezoelectric element has a structure in which electrodes and piezoceramics are alternately laminated and has a low pull allowable stress. Therefore, in a case where the piezoelectric element is used in the unusable region, there is a concern that the life of the element is shortened.

Moreover, the piezoelectric element 11*a*1 can easily generate a great thrust. However, the displacement is extremely small. Accordingly, the displacement is expanded using the buckling displacement expansion mechanism 11*a*. In the present embodiment, the buckling displacement expansion mechanism 11*a* can expand the displacement of the piezoelectric element 11*a*1 by 100 times or more and has characteristics capable of transmitting 70% or more of output energy.

Figure 5:
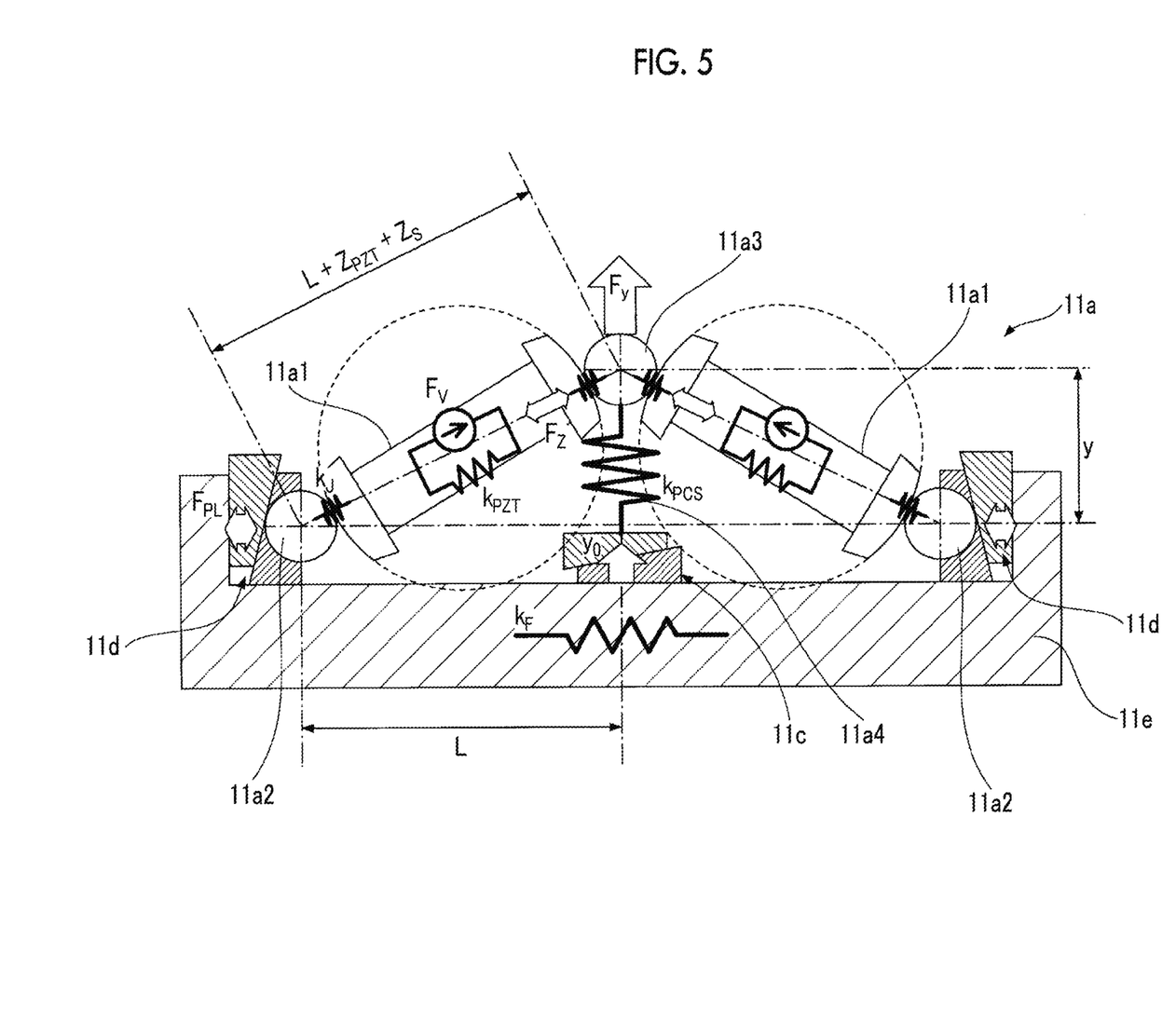
FIG. 5 is a schematic view showing a force acting on each component of a buckling displacement expansion mechanism.
Figure 6:
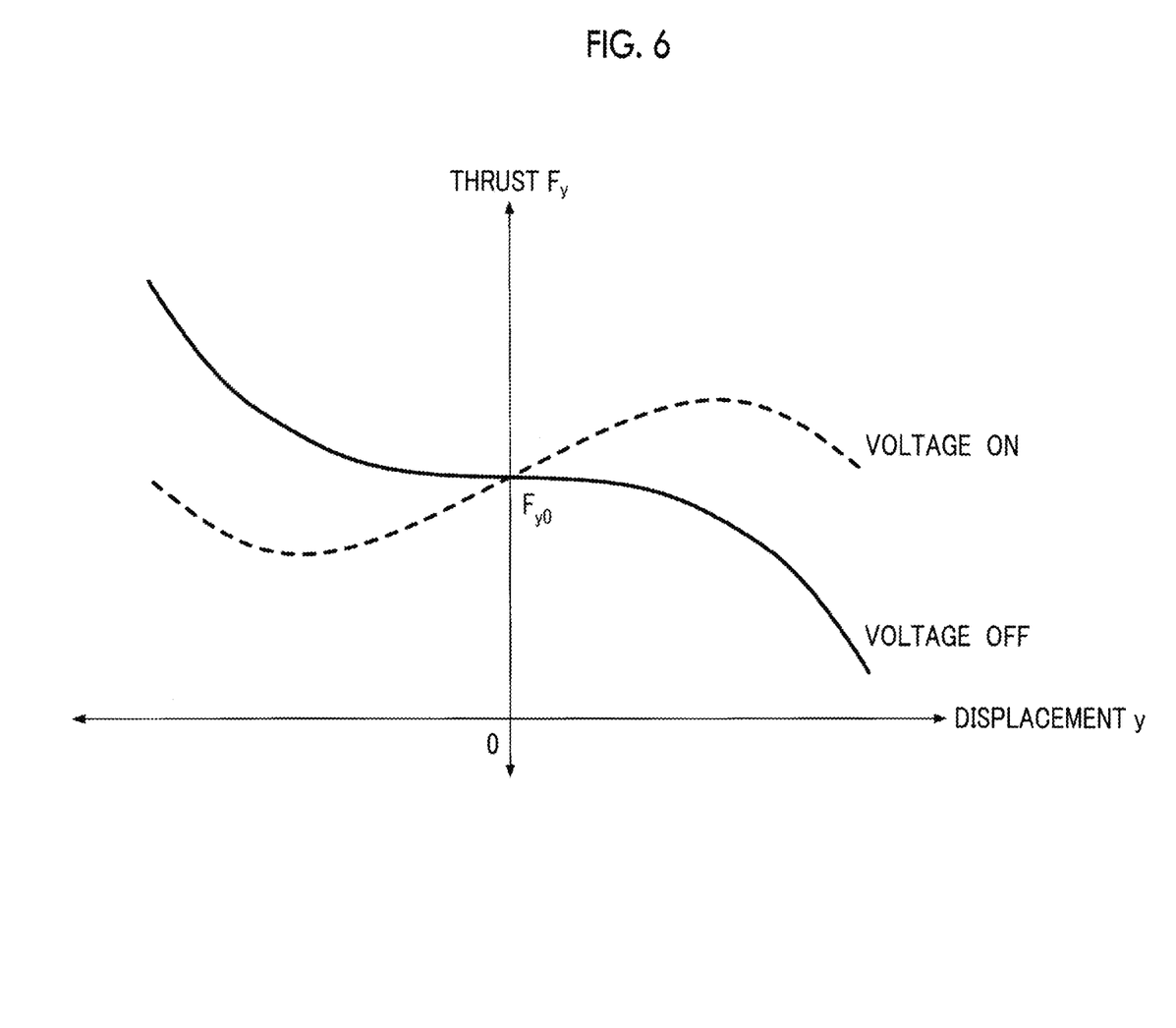
FIG. 6 is a view showing a relationship between displacement (expansion output) and the thrust of an output portion in the buckling displacement expansion mechanism.

Next, output characteristics of the buckling displacement expansion mechanism 11*a* will be described with reference to FIGS. 5 and 6. FIG. 5 is a schematic view showing the force acting on each component of the buckling displacement expansion mechanism 11*a*. In addition, FIG. 6 is a view showing a relationship between displacement (expansion output) y and the thrust $F_y$ of the output portion 11*a*3 in the buckling displacement expansion mechanism 11*a*.

The thrust $F_y$ of the output portion 11*a*3 is represented by the following Expression (1).

$$F_y = k_{PCS} y_0 + \left\{ \frac{2}{L} \frac{k_S}{k_S + k_{PZT}} (F_V + F_{PL}) - k_{PCS} \right\} y - \frac{1}{L^2} \frac{k_S k_{PZT}}{k_S + k_{PZT}} y^3 \quad (1)$$

In addition, in Expression (1) or FIG. 5, $k_{PCS}$ indicates mechanical compression stiffness of the spring preload adjustment mechanism 11*c*, and $k_{PZT}$ indicates mechanical compression stiffness of the piezoelectric element 11*a*1. Moreover, $k_F$ indicates mechanical compression stiffness of the outer shell $11e$, and $k_J$ indicates mechanical compression stiffness of the rolling joint. In addition, $k_S$ indicates total mechanical stiffness of the buckling displacement expansion mechanism $11a$ in the displacement direction of the piezoelectric element $11a1$ and is dependent on the mechanical compression stiffness $k_F$ of the outer shell $11e$ and the mechanical compression stiffness $k_J$ of the rolling joint. Moreover, $y_0$ indicates offset displacement of the spring preload adjustment mechanism $11c$, and L indicates a distance between the rotation center of the rolling joint with respect to the fixation portion $11a2$ and the rotation center of the rolling joint with respect to the output portion $11a3$. In addition, $F_V$ indicates an electric thrust of the piezoelectric element $11a1$, $F_{PL}$ indicates a piezo preload generated by the piezo preload adjustment mechanism $11d$, and $F_Z$ indicates a mechanical thrust generated in the piezoelectric element $11a1$ dependent on the displacement amount of the piezoelectric element $11a1$.

If various mechanical stiffness is set such that the piezo preload $F_{PL}$ becomes a value represented by the following Expression (2), the thrust Fy is represented by the following Expression (3).

$$F_{PL} = \frac{L}{2} \frac{k_S + k_{PZT}}{k_S} k_{PCS} \qquad (2)$$

$$F_y = k_{PCS} y_0 + \frac{2}{L} \frac{k_S}{k_S + k_{PZT}} F_V y - \frac{1}{L^2} \frac{k_S k_{PZT}}{k_S + k_{PZT}} y^3 \qquad (3)$$

Moreover, if a zero order term Fy0 of the displacement y, a coefficient $C_1$ with respect to the $F_V$ of the first order term of the displacement y, and a third order coefficient $C_3$ of the displacement y are defined as the following Expression (4), the thrust $F_y$ is represented by the following Expression (5).

$$F_{y0} = k_{PCS} y_0, \; c_1 = \frac{2}{L} \frac{k_S}{k_S + k_{PZT}}, \; c_3 = \frac{1}{L^2} \frac{k_S k_{PZT}}{k_S + k_{PZT}} \qquad (4)$$

$$F_y = F_{y0} + c_1 F_V y - c_3 y^3 \qquad (5)$$

Moreover, a zero order term Fy0 of the displacement y is a component of the spring preload generated by the spring preload adjustment mechanism $11c$ in the displacement y direction. In addition, a first order term $c_1 F_V y$ of the displacement y is dependent on the spring preload adjusted by the spring preload adjustment mechanism $11c$, the piezo preload $F_{PL}$ adjusted by the piezo preload adjustment mechanism $11d$, and the electric thrust $F_V$ of the piezoelectric element $11a1$. Moreover, in Expression (5), the piezo preload $F_{PL}$ and the spring preload are not present. This is because the piezo preload $F_{PL}$ and the spring preload set as in Expression (2) cancel each other out.

In this way, the thrust $F_y$ of the output portion $11a3$ is represented by the resultant force of a steady term $F_{y0}$ having characteristics which are not dependent on the electric thrust $F_V$ of the piezoelectric element $11a1$ and is not dependent on the displacement y, an input term $c_1 F_V y$ having characteristics which are dependent on the electric thrust $F_V$ of the piezoelectric element $11a1$, and an elastic term $c_3 y^3$ having characteristics which are not dependent on the electric thrust $F_V$ of the piezoelectric element $11a1$ but are dependent on the displacement y.

FIG. 6 is a graph showing a relationship between the thrust $F_y$ and the displacement y of the output portion $11a3$.

In addition, a solid line in FIG. 6 indicates the relationship in a case where a voltage is not applied to the piezoelectric element $11a1$, and a dotted line indicates the relationship in a case where a voltage is applied to the piezoelectric element $11a1$.

As shown in FIG. 6, the thrust $F_y$ always becomes a positive value regardless of the magnitude of the displacement y and presence or absence of the applied voltage. That is, the output portion $11a3$ always generates the thrust $F_y$ by which the output joint $11b$ is pressed against the periodic shape portion 20 of the motor output cam 2 regardless of the magnitude of the displacement y and presence or absence of the applied voltage.

Figure 7:
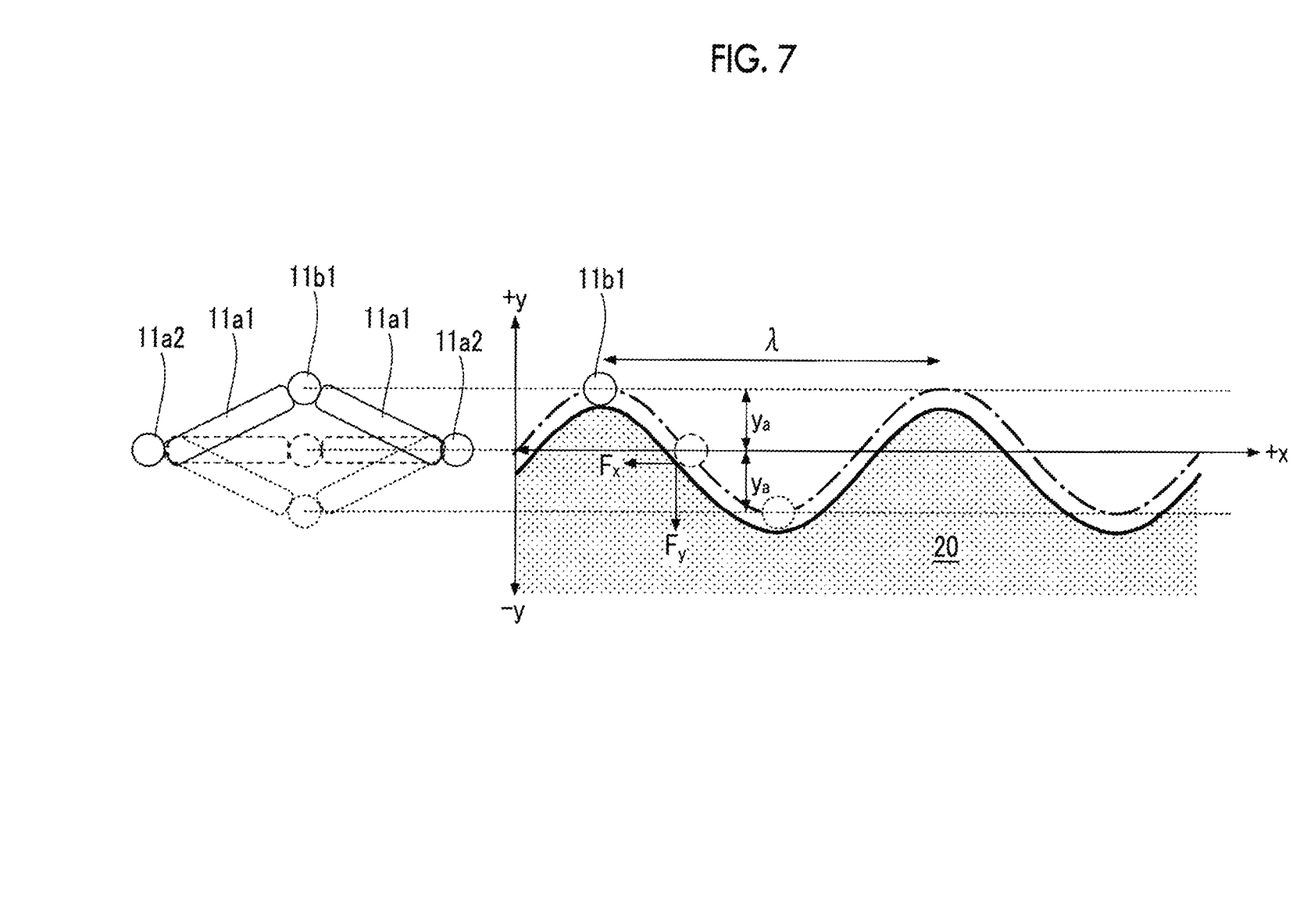
FIG. 7 is a view for explaining a movement of a follower roller which comes into roll-contact with a periodic shape portion of a motor output cam.

Next, unit motor thrust $F_x(x)$ which is transmitted to the motor output cam 2 by each of the plurality of buckling displacement expansion mechanism $11a$ will be described with reference to FIG. 7. FIG. 7 is a view for explaining the movement of the follower roller $11b1$ which comes into roll-contact with the periodic shape portion 20 of the motor output cam 2.

Specifically, a one-dot chain line in FIG. 7 indicates a locus drawn by the follower roller $11b1$ of the output joint $11b$ attached to the output portion $11a3$ of the buckling displacement expansion mechanism $11a$ which buckles in both directions of the +y direction and the −y direction when the capacitive actuator 1 moves in the +x direction.

In the present embodiment, the expansion output of each of the six actuator units 11 is transmitted to the motor output cam 2 via the follower roller $11b1$ of the output joint $11b$ and the periodic shape portion 20. In addition, the present embodiment is configured such that the locus drawn by the follower roller $11b1$ when the capacitive actuator 1 linearly moves in the +x direction along the motor output cam 2 is a sine wave in a side view.

If displacement of the follower roller $11b1$ in the expansion output direction is defined as y and a relative position of the capacitive actuator 1 with respect to the motor output cam 2 is defined as x, a locus y(x) drawn by the follower roller $11b1$ is represented by the following Expression (6), and a differential value with respect to the relative position x of the locus y(x) which is an inclination of a tangent between the follower roller $11b1$ and the periodic shape portion 20 at the relative position x is represented by the following Expression (7).

$$y(x) = y_a \sin\left(\frac{2\pi}{\lambda} x\right) \qquad (6)$$

$$\frac{dy(x)}{dx} = \frac{2\pi y_a}{\lambda} \cos\left(\frac{2\pi}{\lambda} x\right) \qquad (7)$$

In addition, $y_a$ indicates a half amplitude of the sine wave which is the locus drawn by the follower roller $11b1$ and $\lambda$ indicates one wavelength.

In addition, as the following Expression (8), the unit motor thrust $F_x(x)$ which is transmitted to the motor output cam 2 by each of the six actuator units 11 is represented by a product of the thrust $F_y(x)$ of the output portion $11a3$ and the inclination dy(x)/dx of the tangent at the relative position x.

$$F_x(x) = \frac{dy(x)}{dx} F_y(x) \qquad (8)$$

In addition, Expression (8) is represented by the following Expression (9) using Expression (5) and Expression (7).

$$F_x(x) = \frac{dy(x)}{dx}\{F_{y0} + c_1 F_V y(x) - c_3 y(x)^3\} \quad (9)$$

$$= \frac{2\pi y_a}{\lambda}\cos\left(\frac{2\pi}{\lambda}x\right)\left[\begin{array}{c} F_{y0} + c_1 F_V y_a \sin\left(\frac{2\pi}{\lambda}x\right) - \\ c_3\left\{y_a \sin\left(\frac{2\pi}{\lambda}x\right)\right\}^3 \end{array}\right]$$

That is, the steady term of the unit motor thrust $F_x(x)$ is represented by cos, the input term is represented by $F_V \cdot \cos \cdot \sin$, and the elastic term is represented by $-\cos \cdot \sin^3$.

Moreover, if a half amplitude $y_a$ of the sine wave drawn by the follower roller 11b1 is defined as a value $y_{Free}$, Expression (9) is represented by the following Expression (10). In addition, coefficients $A_{FC}$, $A_{FX}$, and $y_{Free}$ are represented by the following Expression (11). In this case, the unit motor thrust $F_x(x)$ is represented by trigonometric function components with respect to three frequencies of a first harmonic (fundamental wave), a second harmonic, and a fourth harmonic.

$$F_x(x)|_{y_a = y_{Free}} = A_{FC}\cos\left(\frac{2\pi}{\lambda}x\right) + \quad (10)$$

$$A_{Fx}\left[\frac{F_V}{F_{Block}}\sin\left\{2\left(\frac{2\pi}{\lambda}x\right)\right\} - \frac{1}{2}\sin\left\{2\left(\frac{2\pi}{\lambda}x\right)\right\} + \frac{1}{4}\sin\left\{4\left(\frac{2\pi}{\lambda}x\right)\right\}\right]$$

$$A_{FC} = \frac{2\pi y_{Free}}{\lambda}F_{y0}, \; A_{Fx} = \frac{4\pi z_{Free} F_{Block}}{\lambda} \cdot \frac{k_S}{k_{PZT} + k_S}, \quad (11)$$

$$y_{Free} = \sqrt{2 z_{Free} L}$$

Figure 8:
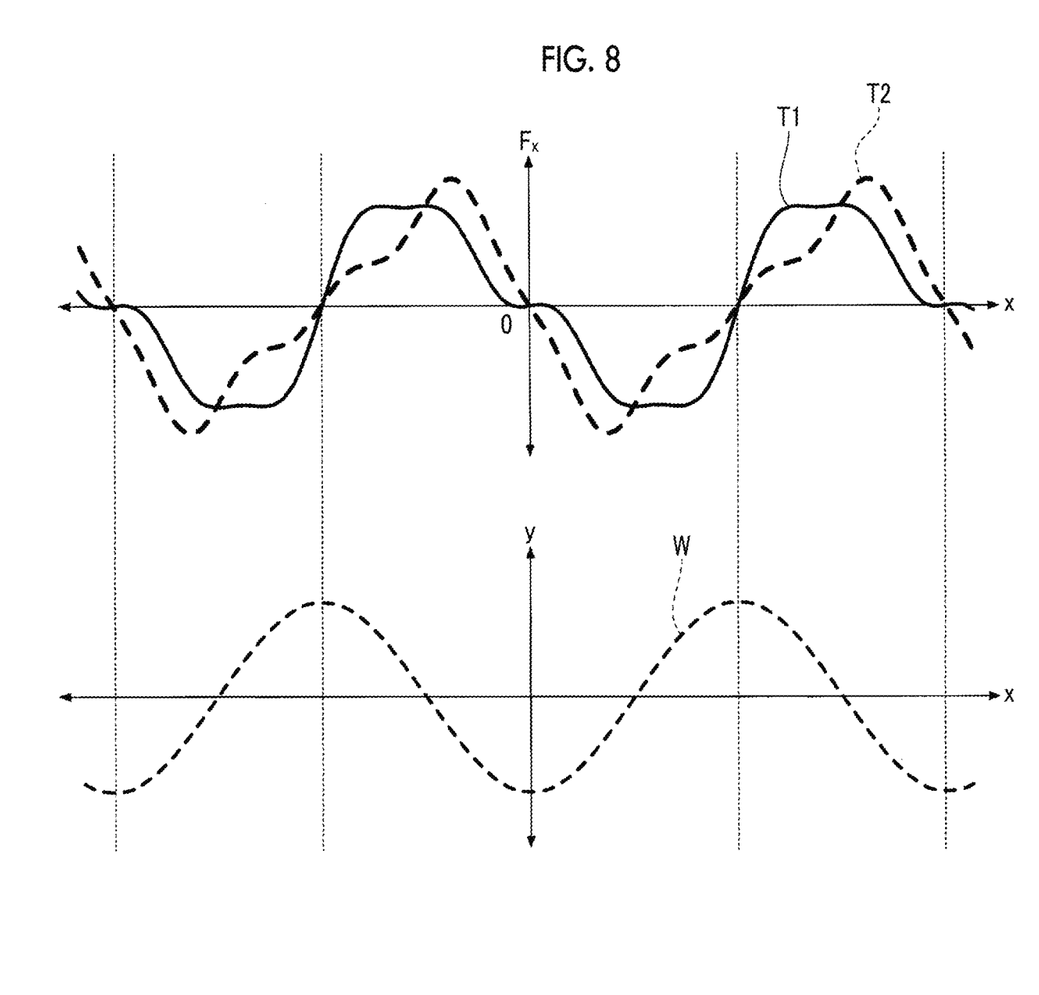
FIG. 8 is a graph showing a transition of a unit motor thrust.

FIG. 8 is a graph showing a transition with respect to the relative position x of the unit motor thrust $F_x(x)$ represented by Expression (10), and shows the transition in association with the sine wave W drawn by the follower roller 11b1. In addition, a transition T1 in FIG. 8 indicates a transition in a case where a voltage is not applied to the piezoelectric element 11a1, and a transition T2 indicates a transition in a case where a voltage is applied to the piezoelectric element 11a1.

As shown in FIG. 8, the transition of the unit motor thrust $F_x(x)$ has a point symmetrical relationship with respect to a zero point regardless of the presence or absence of the applied voltage.

The motor output cam 2 integrates the plurality of unit motor thrust $F_x(x)$ having the above-described characteristics and the resultant force thereof is defined as motor thrust $F_M(x)$. In addition, in a case where N actuator units 11 are disposed with respect to the motor output cam 2 so that equiphase intervals are obtained at a length equal to or more than one wavelength of the sine wave drawn by the follower roller 11b1, that is, one or more periods of the periodic shape portion 20 are equally divided, the motor thrust $F_M(x)$ with respect to the relative position x is represented by the following Expression (12).

$$F_M(x) = A_{FC}\sum_{k=1}^{N}\cos\left(\frac{2\pi}{\lambda}x + \phi_k\right) + A_{Fx}\sum_{k=1}^{N}\frac{F_{Vk}}{F_{Block}}\sin\left\{2\left(\frac{2\pi}{\lambda}x + \phi_k\right)\right\} + \quad (12)$$

$$A_{Fx}\sum_{k=1}^{N}\left[-\frac{1}{2}\sin\left\{2\left(\frac{2\pi}{\lambda}x + \phi_k\right)\right\} + \frac{1}{4}\sin\left\{4\left(\frac{2\pi}{\lambda}x + \phi_k\right)\right\}\right]$$

In addition, $\phi_k$ indicates a relative phase angle of a position of a kth actuator unit 11 (the rotation center of the follower roller 11b1) with respect to a position of a first actuator unit 11 (the rotation center of the follower roller 11b1), and $F_{Vk}$ indicates electric thrust $F_V$ of the piezoelectric element 11a1 in the kth actuator unit 11.

In addition, in a case of a phase disposition in which the N actuator units 11 (the rotation center of the follower roller 11b1) satisfy the following Expression (13), as the following Expression (14), the motor thrust $F_M(x)$ is represented by only the input term including the electric thrust $F_{Vk}$. That is, the steady term and the elastic term among the acting forces on the motor output cam 2 by the actuator units 11 cancel each other out between the actuator units 11. This is because other terms are eliminated by the theorem on trigonometric functions as shown in the following Expression (15).

$$\phi_k = \left\{\begin{array}{l} \frac{1}{4} \cdot 2\pi p \cdot \frac{k}{N} \; \Big| \; k, m, N, p, q \in \text{positive integer} \\ 1 \leq k \leq N, N \geq 2, p = 2q, q \in \text{even number}, p \neq mN \end{array}\right\} \quad (13)$$

$$F_M(x) = A_{Fx}\sum_{k=1}^{N}\frac{F_{Vk}}{F_{Block}}\sin\left\{2\left(\frac{2\pi}{\lambda}x + \frac{2\pi p}{4}\frac{k}{N}\right)\right\} \quad (14)$$

$$\sum_{k=1}^{N}\sin\left(2\pi \cdot p \cdot \frac{k}{N}\right) = 0, \; \sum_{k=1}^{N}\cos\left(2\pi \cdot p \cdot \frac{2\pi k}{N}\right) = 0, \; p \neq \text{multiple of } N \quad (15)$$

In addition, in a case of a phase disposition in which the N actuator units 11 (the rotation center of the follower roller 11b1) satisfy the following Expression (16), as the following Expression (17), the motor thrust $F_M(x)$ is represented by only the steady term and the input term. That is, the elastic terms among the acting forces on the motor output cam 2 by the actuator units 11 cancel each other out between the actuator units 11.

$$\phi_k = \left\{\begin{array}{l} \frac{1}{4} \cdot 2\pi p \cdot \frac{k}{N} \; \Big| \; k, m, N, p, q \in \text{positive integer} \\ 1 \leq k \leq N, N \geq 2, p = 2(q+1), q \in \text{even number}, p \neq mN \end{array}\right\} \quad (16)$$

$$F_M(x) = \quad (17)$$

$$A_{FC}\sum_{k=1}^{N}\cos\left(\frac{2\pi}{\lambda}x + \frac{2\pi p}{4}\frac{k}{N}\right) + A_{Fx}\sum_{k=1}^{N}\frac{F_{Vk}}{F_{Block}}\sin\left\{2\left(\frac{2\pi}{\lambda}x + \frac{2\pi p}{4}\frac{k}{N}\right)\right\}$$

Moreover, in a case where the applied voltage is adjusted such that the electric thrust $F_{Vk}$ of the piezoelectric element 11a1 of each of the N actuator units 11 becomes the sine wave shown in the following Expression (18), the motor thrust $F_M(x)$ of the capacitive actuator motor 100 which is disposed to have the phase which satisfies Expression (13) is represented by Expression (19). In addition, $F_W$ indicates an input amplitude which is the entire amplitude of the waveform (sine wave) of the applied voltage, and $P_{com}$ indicates an input phase which is a phase difference between the waveform (sine wave) of the applied voltage and the second harmonic of the sine wave which is the locus drawn by the follower roller 11b1.

$$F_{Vk}(x, F_W, P_{com}) = \frac{F_W}{2}\left[1 + \sin\left\{2\left(\frac{2\pi}{\lambda}x + \phi_k + P_{com}\right)\right\}\right] \quad (18)$$

$$F_M(x) = N \frac{A_{Fx}}{4} \frac{F_W}{F_{Block}} \cos(2P_{com}) \quad (19)$$

As shown in Expression (19), the motor thrust $F_M(x)$ of the capacitive actuator motor 100 disposed to have the phase which satisfies Expression (13) is proportional to the input amplitude $F_W$ and is proportional to $\cos(2P_{com})$ which varies within a range of ±1 depending on the input phase $P_{com}$. Moreover, considering polarization characteristics of the piezoelectric element 11a1, it is not preferable to give a negative value to the input amplitude. Accordingly, preferably, the input amplitude is used to control an absolute value of the motor thrust $F_M(x)$.

In addition, since the input phase does not suffer from the above-described limitation, it is possible to freely set the amplitude and polarity thereof. In addition, when the input amplitude increases in a case where small motor thrust $F_M(x)$ is obtained, the unit motor thrust $F_x(x)$ cancel each other out by the motor output cam 2 to obtain desired motor thrust $F_M(x)$. However, in this case, loss in energy inside the capacitive actuator 1 increases. Accordingly, preferably, the input phase is mainly used to control the polarity of the motor thrust $F_M(x)$, and the input amplitude is mainly used to control the absolute value of the motor thrust $F_M(x)$.

Moreover, in a case where the applied voltage is adjusted such that the electric thrust $F_{Vk}$ of the piezoelectric element 11a1 of each of the N actuator units 11 becomes the sine wave shown in Expression (18), the motor thrust $F_M(x)$ of the capacitive actuator motor 100 which is disposed to have the phase which satisfies Expression (13) is represented by Expression (20).

$$F_M(x) = N \frac{A_{Fx}}{4} \frac{F_W}{F_{Block}} \cos(2P_{com}) + A_{FC} \sum_{k=1}^{N} \cos\left(\frac{2\pi}{\lambda} x + \frac{2\pi p}{4} \frac{k}{N}\right) \quad (20)$$

As shown in Expression (20), the motor thrust $F_M(x)$ of the capacitive actuator motor 100 which is disposed to have the phase which satisfies Expression (16) is represented by superimposing characteristics of a second term on the right side to characteristics of a first term on the right side. In addition, the characteristics of the first term on the right side are the same as the characteristics on the right side of Expression (19), and the characteristics of the second term on the right side are characteristics dependent on a zero order term of the electric thrust $F_V$ of the actuator unit 11 represented by the coefficient $A_{FC}$. Accordingly, it is not necessary to supply power in order to generate the motor thrust. Therefore, it can be used as a fall prevention function, for example, in applications which are driven while supporting the gravity.

Moreover, as described above, in any case of the capacitive actuator motor 100 disposed to have the phase which satisfies Expression (13) or Expression (16), each of the N actuator units 11 always presses the output portion 11a3 to the surface of the periodic shape portion 20 of the motor output cam 2 regardless of the relative position x. Specifically, the output portion 11a3 always presses the output portion 11a3 to the surface of the periodic shape portion 20 including a case where the output portion 11a3 is displaced in a direction which is away from the motor output cam 2. Accordingly, the capacitive actuator motor 100 can act all the energy which can be output by the piezoelectric elements 11a1 on the motor output cam 2.

In addition, according to the configuration in which the plurality of actuator units 11 are appropriately disposed considering the phase of the periodic shape portion 20 as shown in Expression (13), the capacitive actuator motor 100 can cancel out thrust components other than the thrust component (for example, the input term having characteristics dependent on the electric thrust $F_V$) of the piezoelectric element 11a1 caused by the input from the outside, between the actuator units 11. According, it is possible to realize high accuracy and high controllability by controlling only the applied voltage with respect to the piezoelectric element 11a1.

In addition, according to the configuration in which the plurality of actuator units 11 are appropriately disposed considering the phase of the periodic shape portion 20 as shown in Expression (16), the capacitive actuator motor 100 can cancel out thrust components other than the thrust component (for example, the input term having characteristics dependent on the electric thrust $F_V$ and the zero order term of the thrust $F_y$ of the actuator unit 11) of the piezoelectric element 11a1 caused by the input from the outside, between the actuator units 11. Accordingly, it is possible to realize not only high accuracy and high controllability but also position holding thrust when no power is supplied by controlling only the applied voltage with respect to the piezoelectric element 11a1.

Moreover, the offset force is adjusted by the preload adjustment spring 11a4 such that the thrust $F_y$ always has the same polarity. Accordingly, a user can always cause the follower roller 11b1 of the output joint 11b and the periodic shape portion 20 of the motor output cam 2 to come into contact with each other. Therefore, the capacitive actuator motor 100 can maintain a state in which all the output energy of the piezoelectric element 11a1 can be transmitted to the motor output cam 2, and it is possible to realize drive without backlash.

Moreover, the capacitive actuator motor 100 has a simple configuration using a motor output cam 2 having the periodic shape portion 20 on only the upper surface. Accordingly, it is possible to relatively easily realize reductions in size and weight of the capacitive actuator motor 100. In addition, pitching moment when the motor is driven is decreased by the reduction of size, and thus, the following effects can be realized. That is, operation accuracy is improved, operation noise is decreased, and loads with respect to vibrations in the motor guide 12 and the motor guide rail 21 are reduced.

Hereinbefore, the embodiment of the present invention is described. However, the present invention is not limited to a specific embodiment and various changes and modifications can be applied to the present invention within the scope of the gist of the present invention described in claims.

For example, the above-described embodiment relates to the linear motor. However, the present invention may be applied to a rotary motor.

Moreover, in the above-described embodiment, the preload adjustment spring 11a4 is adopted as an example of the urging means. However, its own weight of the capacitive actuator 1 may be used as the urging means.

In addition, in the above-described embodiment, the preload adjustment spring 11a4 presses the follower roller 11b1 of the output joint 11b to the periodic shape portion 20 of the motor output cam 2 via the output portion 11a3 of the buckling displacement expansion mechanism 11a. However, the preload adjustment spring 11a4 may pull the follower roller 11b1 in the direction of the periodic shape portion 20 so as to cause the follower roller 11b1 to come into contact with the periodic shape portion 20.

Moreover, in the above-described embodiment, the motor output cam 2 is disposed to extend in the horizontal direction. However, the motor output cam 2 may be disposed to extend in the vertical direction.

In addition, in the above-described embodiment, the output direction of the output portion 11a3 is set to the direction (vertical direction) orthogonal to the extension direction (horizontal direction) of the motor output cam 2. However, the output direction of the output portion 11a3 is not necessarily the direction orthogonal to the extension direction of the motor output cam 2, and may be inclined with respect to the extension direction of the motor output cam 2.

It should be understood that the invention is not limited to the above-described embodiment, but may be modified into various forms on the basis of the spirit of the invention. Additionally, the modifications are included in the scope of the invention.

What is claimed is:

1. An actuator, comprising:
   a capacitive actuator that comprises a plurality of actuator units; and
   a motor output cam,
   wherein each of the actuator units comprises:
      an expandable element having capacitive properties;
      a displacement expansion mechanism configured to convert displacement of the expandable element into an expanding displacement in a predetermined direction by generating a buckling phenomenon; and
      an output transmission portion configured to transmit an output of the displacement expansion mechanism to the motor output cam;
      wherein the motor output cam comprises a periodic shape portion with which the output transmission portion is in contact;
      wherein the actuator further comprises an urger configured to always generate an urging force that causes the periodic shape portion and the output transmission portion to come into contact with each other; and
   wherein the urging force is always a positive value such that the output transmission portion is pressed against the periodic shape portion regardless of a magnitude of the expanding displacement of the expandable element and the presence or absence of a voltage applied to the expandable element.

2. The actuator according to claim 1,
   wherein each of the plurality of actuator units generates a unit motor thrust by pressing or pulling the output transmission portion in the direction of the motor output cam, and
   wherein each of the plurality of actuator units is disposed at a phase interval with respect to the periodic shape portion such that in a motor thrust which is a resultant force of unit motor thrusts generated by each of the plurality of actuator units, thrust components other than a thrust component generated by an input of the expandable element from the outside cancel each other out between the plurality of actuator units.

3. The actuator according to claim 1,
   wherein each of the plurality of actuator units generates a unit motor thrust by pressing or pulling the output transmission portion in the direction of the motor output cam, and
   wherein each of the plurality of actuator units is disposed at a phase interval with respect to the periodic shape portion such that in a motor thrust which is a resultant force of unit motor thrusts generated by each of the plurality of actuator units, a thrust component generated by an input of the expandable element from the outside and thrust components other than a thrust component generated by the urger cancel each other out between the plurality of actuator units.

4. The actuator according to claim 2,
   wherein a disposition of each of the plurality of actuator units at the phase interval with respect to the periodic shape portion comprises a disposition which equally divides one or more periods of the periodic shape portion.

5. The actuator according to claim 1,
   wherein the expandable element is a piezoelectric element, and
   wherein the displacement expansion mechanism is a buckling displacement expansion mechanism.

6. The actuator according to claim 1,
   wherein the displacement expansion mechanism is a buckling displacement expansion mechanism.

7. The actuator according to claim 1,
   wherein the output transmission portion comprises a roller, and
   wherein the periodic shape portion has a shape which comprises a sinusoidal component.

8. An actuator unit in the actuator according to claim 1.

9. A capacitive actuator in the actuator according to claim 1.

10. The actuator according to claim 3,
    wherein a disposition of each of the plurality of actuator units at the phase interval with respect to the periodic shape portion comprises a disposition through which one or more periods of the periodic shape portion are equally divided.

* * * * *